Nov. 12, 1968  M. W. WISHNICK  3,409,935
DETACHABLE SHEET METAL HANDLE FOR A KITCHEN UTENSIL
Filed Oct. 23, 1965
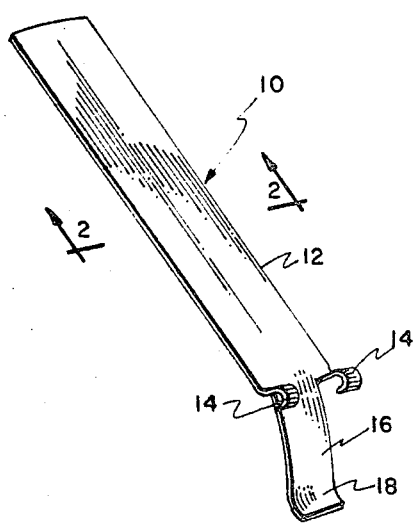
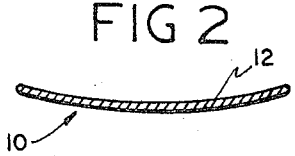
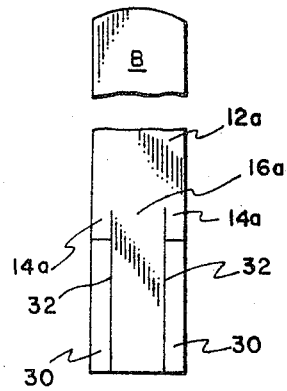
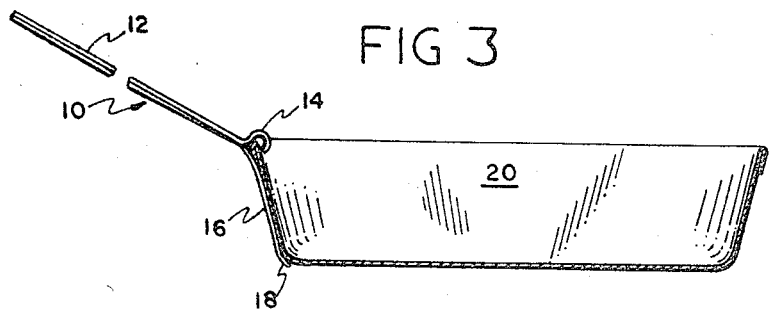
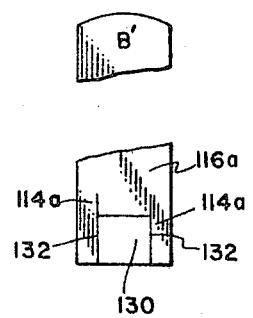
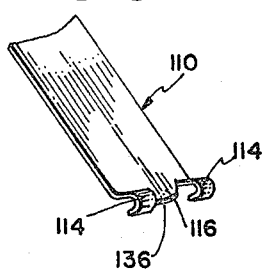
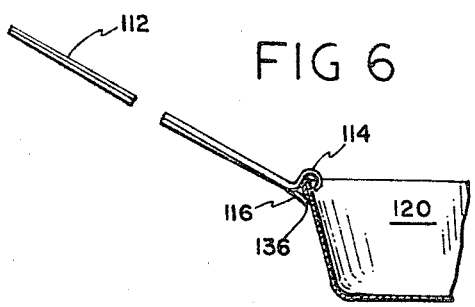
INVENTOR
MILTON W. WISHNICK
BY
ATT'Y

United States Patent Office 3,409,935
Patented Nov. 12, 1968

3,409,935
DETACHABLE SHEET METAL HANDLE FOR A KITCHEN UTENSIL
Milton W. Wishnick, 400 E. Randolph St., Chicago, Ill. 60601
Filed Oct. 23, 1965, Ser. No. 502,924
1 Claim. (Cl. 16—114)

ABSTRACT OF THE DISCLOSURE

A detachable handle for kitchen utensils of either shallow or deep cup-shaped or dished design. The handle is of one-piece sheet metal construction which lends itself to a simple stamping operation. When applied to a utensil, a pair of hook-over tongues engage the rim of the utensil and a short central bearing tongue engages the side wall of the utensil on edge-to-face contact therewith, thus supporting the utensil in compression.

---

The improved sheet metal pan handle comprising the present invention has been designed for use primarily as a lifting handle for a frying pan, skillet, sauce pan, or similar shallow open-rim utensil having a continuous upwardly flared side wall. The invention is, however, capable of other uses and a handle constructed according to the principles of the present invention may, if desired and with or without modification as required, be employed in connection with a pot, open-rim kettle or other relatively deep kitchen utensil of a similar nature. Irrespective, however, of the particular use to which the invention may be put, the essential features thereof are at all times preserved.

The principal object of the invention is to provide a novel one-piece detachable sheet metal handle which may quickly and easily be applied to or removed from a utensil while the latter is positioned or located on a stove or over a flame without necessitating touching of the utensil, or, in fact, moving the same from its position of rest, and which, additionally, may be applied to the utensil from any radial angle so that the contents of the utensil may be presented in an optimum position when transferring the same to a plate or platter, or so that any pouring lip which may be associated with the rim of the utensil may be conveniently oriented for either a right or a left-handed person.

Another object of the invention is to provide such a detachable sheet metal handle which will retain a safe purchase upon the utensil to which it is applied so as to permit steep tilting of the utensil as, for example, when pouring the contents of the utensil.

Another and important object of the invention is to provide a unitary one-piece detachable sheet metal handle which may be economically fashioned by a simple slitting and stamping operation, thereby contributing to economy or low cost of manufacture.

Finally, it is an object of the invention to provide a detachable handle which is selectively applicable to various forms of pans and other similar utensils so that a multiplicity of utensils on a multiple burner gas range, for example, may be conveniently handled as desired and the danger of handle heating which is invariably present when individual fixed handles are provided on the utensils thus obviated.

Other objects and advantages of the invention, not at this time enumerated, will readily suggest themselves as the following description ensues.

In the accompanying single sheet of drawings forming a part of this specification, two illustrative embodiments of the invention are shown.

In these drawings:

FIG. 1 is a perspective view of one form of detachable handle embodying the principles of the invention;

FIG. 2 is a transverse sectional view taken on the line 2—2 of FIG. 1;

FIG. 3 is a side elevational view of the handle of FIG. 1, showing the same in actual use;

FIG. 4 is a plan view of a blank from which the handle of FIG. 1 is formed;

FIG. 5 is a perspective view similar to FIG. 1 but showing a slightly modified form of handle;

FIG. 6 is a side elevational view similar to FIG. 3, showing the modified form of handle in actual use; and FIG. 7 is a plan view of the blank from which the handle of FIG. 5 is formed.

Referring now to the drawings in detail and in particular to FIGS. 1 and 2 wherein one form of the improved detachable handle is illustrated, the handle is designated in its entirety by the reference numeral 10 and is comprised of an elongated shank portion 12 from which there project at its distal end a pair of spaced apart hooks 14 and a pan-supporting foot 16. The hooks 14 are of inverted J-shape and they project upwardly above the level of the forward end of the shank portion 12 and face forwardly and downwardly. The foot 16 projects forwardly and downwardly below the level of the forward end of the shank portion and the extreme forward region of said foot is curved upwardly so as to provide a shallow cradle 18.

In use for pan-lifting purposes, the two hooks 14 are engaged over the rim of a utensil such as the pan 20 of FIG. 3 while the foot 16 is caused to bear against the continuous upwardly and outwardly flared side wall of the pan. The circular bottom edge of the pan nests within the cradle 18. It is necessary in thus installing the handle 10 on the pan 20 first to engage the hooks 14 and the rim of the pan, after which the cradle 18 may be swung under the bottom edge of the pan. When thus in position, the cradle will prevent the hooks 14 from becoming disengaged regardless of the angle at which the pan may be tilted, providing, of course, that the pan is not inverted. Removal of the handle may be accomplished by a reversal of the process outlined above.

In the form of the invention illustrated in FIGS. 1 to 3, inclusive, the shank portion 12 of the handle 10 extends at an angle of approximately 45° to the plane of the bottom wall of the pan so that the handle as a whole is elevated above the level of the pan and the contents of the pan may conveniently be viewed from above. Other angles are, however, contemplated and the particular angle desired will be a function of the angle of inclination of the foot portion 16 with respect to the axis of the shank portion 12.

As best seen in FIG. 2, the shank portion 16 of the handle is arcuate in transverse cross section on a relatively long radius of curvature, thus lending rigidity to the same.

The one-piece handle 10 is constructed from a flat sheet metal blank, preferably steel, such as is shown in FIG. 4 and designated by the reference letter B. The blank is generally of elongated rectangular configuration and, in the die-forming operation thereof, the corners at one end of the blank are notched by the removal of two elongated narrow sections 30 and the blank is longitudinally slitted at 32, thus leaving two narrow marginal tongues 14a which constitute the unformed hooks 14 and a medial relatively wide tongue 16a which constitutes the foot 16. Either simultaneously with the stamping operation or in a succeeding operation, the tongues 14a and the tongue 16a are shaped to their final form wherein they form the hooks 14 and the foot 16 respectively, while the shank portion 12a is given its transverse curvature as previously described.

In FIGS. 5 and 6, a slightly modified form of detachable handle 110 is illustrated. This handle is similar in many respects to the handle 10 and, therefore, in order to avoid needless repetition of description, corresponding reference numerals but of a higher order have been applied to the corresponding parts as between the disclosures of FIG. 1 and FIG. 5.

The shank portion 112 and the hooks 114 of the handle 110 are substantially identical to the shank portion 12 and the hooks 14 of the handle 10, but the foot 116 is considerably shorter and it projects forwardly in the general horizontal plane of the shank axis. In use, engagement of the handle 110 with the pan 120 is confined largely to the rim region of the pan and the distal edge 136 of the foot 116 abuts against the side wall of the pan as shown in FIG. 6. In the illustrated form of FIG. 5, the shank portion 112 is designed to extend substantially horizontally when the handle 110 is applied to the pan.

The blank from which the handle 110 is formed is shown in FIG. 7 and is designated by the reference letter B'. It is similar to the blank B but, instead of performing a dual notching operation as described in connection with the blank B, a single notching operation wherein a rectangular section 130 is removed is resorted to. After the notching operation, or simultaneously therewith if desired, the slits 132 are created, thus establishing the narrow marginal tongues 114a and the medial or central wide tongue 116a. These three tongues are then shaped as heretofore described to produce the hooks 114 and the intermediate foot 116.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claim is the same to be limited.

Having thus described the invention what I claim as new and desire to secure by Letters Patent is:

1. A unitary sheet metal handle adapted for detachable connection to an open-rim kitchen utensil having a continuous side wall, said handle comprising a unitary structure formed from a single rectangular sheet metal blank, one end of the blank being provided with two spaced apart longitudinal slits extending inwardly of the blank from one end edge thereof to provide two parallel spaced apart narrow marginal tongues and an intervening relatively wide medial tongue, said narrow tongues being bent upwardly out of the general plane of the shank portion and then forwardly and downwardly, thus providing a pair of hooks adapted to engage over the rim of the utensil, said wide tongue extending forwardly in the general plane of the shank portion and being designed for edge-to-face engagement with the side wall of the utensil, the length of said wide medial tongue being appreciably less than the length of said narrow marginal tongues but not in excess of the forward projection of said latter tongues, said shank portion being arcuate in transverse cross section and on a relatively long radius.

References Cited
UNITED STATES PATENTS

| | | | |
|---|---|---|---|
| 938,187 | 10/1909 | Walker. | |
| 2,665,936 | 1/1954 | Moore. | |
| 894,725 | 7/1908 | Cooper | 16—114 |
| 940,422 | 11/1909 | Ballman | 16—114 |

BOBBY R. GAY, *Primary Examiner.*

D. L. TROUTMAN, *Assistant Examiner.*